(12) United States Patent
Park et al.

(10) Patent No.: US 7,677,657 B2
(45) Date of Patent: Mar. 16, 2010

(54) ACTIVE HEADREST ASSEMBLY FOR VEHICLE

(75) Inventors: Sang Do Park, Ansan-si (KR); Dong Woo Jeong, Hwaseong-si (KR); Joo Yeong Yu, Osan-si (KR)

(73) Assignees: Hyundai Motor Company, Seoul (KR); Kia Motors Corp., Seoul (KR); Dymos Inc., Seosan-Si (KR)

( * ) Notice: Subject to any disclaimer, the term of this patent is extended or adjusted under 35 U.S.C. 154(b) by 0 days.

(21) Appl. No.: 12/061,530

(22) Filed: Apr. 2, 2008

(65) Prior Publication Data

US 2009/0134684 A1    May 28, 2009

(30) Foreign Application Priority Data

Nov. 27, 2007    (KR) ...................... 10-2007-0121501

(51) Int. Cl.
*B60N 2/427* (2006.01)
(52) U.S. Cl. .............................. 297/216.12; 297/284.4; 297/284.7
(58) Field of Classification Search ............ 297/216.12, 297/284.4, 284.7
See application file for complete search history.

(56) References Cited

U.S. PATENT DOCUMENTS

| 6,338,530 | B1 * | 1/2002 | Gowing .................... 297/284.4 |
| 6,375,262 | B1 * | 4/2002 | Watanabe ................ 297/284.4 |
| 6,719,368 | B1 * | 4/2004 | Neale ..................... 297/216.14 |
| 6,779,844 | B2 * | 8/2004 | Dosen et al. ............. 297/284.4 |
| 6,837,541 | B2 * | 1/2005 | Farquhar et al. ........ 297/216.13 |
| 6,908,153 | B2 * | 6/2005 | Blendea .................... 297/284.4 |
| 6,955,397 | B1 * | 10/2005 | Humer .................. 297/216.12 |
| 7,044,544 | B2 * | 5/2006 | Humer et al. .......... 297/216.12 |
| 7,325,869 | B2 * | 2/2008 | Braune .................. 297/216.12 |
| 7,393,052 | B2 * | 7/2008 | Humer et al. .......... 297/216.12 |

\* cited by examiner

*Primary Examiner*—Peter R. Brown
(74) *Attorney, Agent, or Firm*—Morgan, Lewis & Bockius LLP

(57) ABSTRACT

An active headrest assembly for a vehicle includes a headrest supported by a seat back frame. An active plate is connected to the headrest and has guide slots defined therein. Guide pins are inserted through the guide slots to slide along the guide slots. A lumbar unit has a support wire secured to the guide pins and is rotatably connected to the lower end of the seat back frame. A returning unit elastically connects the active plate and the lumbar unit with each other.

5 Claims, 4 Drawing Sheets

ACTIVE HEADREST ASSEMBLY FOR VEHICLE

CROSS-REFERENCE TO RELATED APPLICATIONS

This application claims priority to Korean Application No. 10-2007-0121501, filed on Nov. 27, 2007, the disclosure of which is incorporated herein by reference.

BACKGROUND OF THE INVENTION

1. Field of the Invention

The present invention relates to an active headrest assembly for a vehicle which has a lumbar unit cooperating with an active plate.

2. Description of the Prior Art

As is well known in the art, an active headrest assembly for a vehicle serves as a device in which a headrest cooperates with an active plate installed in a seat back to help protect an occupant's head and neck against neck injury.

A conventional active headrest assembly includes an active plate, which is transversely arranged in the seat back frame of a seat back, and a headrest, which is connected to the active plate to rotate around the upper end of the seat back frame. If shock is generated when the vehicle is in a collision, rearward force is applied to the active plate by an occupant leaning on the seat back. As the active plate is rotated rearward by the application of the force, the headrest is rotated forward. By this fact, the headrest comes into close contact with the rear portion of the occupant's head and prevents the occupant's neck from being injured.

However, in order to ensure the reliable functioning of the headrest, the active plate must project forward to some extent. The projecting active plate may decrease the riding comfort of an occupant who leans with his or her back on the seat back.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide an active headrest assembly for a vehicle in which an active plate cooperates with a lumbar unit to improve operational responsiveness of the headrest.

In one exemplary embodiment of the present invention, an active headrest assembly for a vehicle comprises a headrest, an active plate, guide pins, a lumbar unit, a support wire, and a returning unit. The headrest is supported by a seat back frame. The active plate is connected to the headrest and has guide slots defined therein. The guide pins are inserted through the guide slots and slide along the guide slots. The lumbar unit has the support wire which is secured to the guide pins, and is rotatably connected to the lower end of the seat back frame. The returning unit elastically connects the active plate and the lumbar unit with each other.

According to another exemplary embodiment of the present invention, the lumber unit comprises a support wire, a support plate and a lumbar plate. The support wire is hingedly connected to the lower end of the seat back frame and extends toward the upper end of the seat back frame. The support plate is connected to the support wire to slide on the support wire. The lumbar plate is secured to the front surface of the support plate.

In another exemplary embodiment of the present invention, the guide pin comprises a clip portion, a head portion and a body portion. The clip portion has a conical shape and is seated against the guide slot. The head portion has one end of the support wire secured thereto. The body portion connects the clip portion and the head portion to each other and slides along the guide slot.

According to a further exemplary embodiment of the present invention, the support plate comprises an upper plate, a lower plate and curved plates. The lower plate is separate from and located below the upper plate. The curved plates are secured to the rear surface of the lumbar plate and connect the upper plate and the lower plate with each other.

According to yet another exemplary embodiment of the present invention, the returning unit comprises a rotation bracket and a spring. The rotation bracket hingedly connects one end of the active plate and the seat back frame with each other. The spring elastically connects the rotation bracket and the active plate with each other.

According to still another exemplary embodiment of the present invention, the lumbar unit further comprises a first actuator and a second actuator. The first actuator is connected to the support plate to raise and lower the support plate. The second actuator is connected to the support plate to bend the lumbar plate.

According to a still further exemplary embodiment of the present invention, when the upper end of the lumbar unit is pushed rearward, the support wire presses the active plate, and the headrest projects forward to thus support an occupant's neck.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
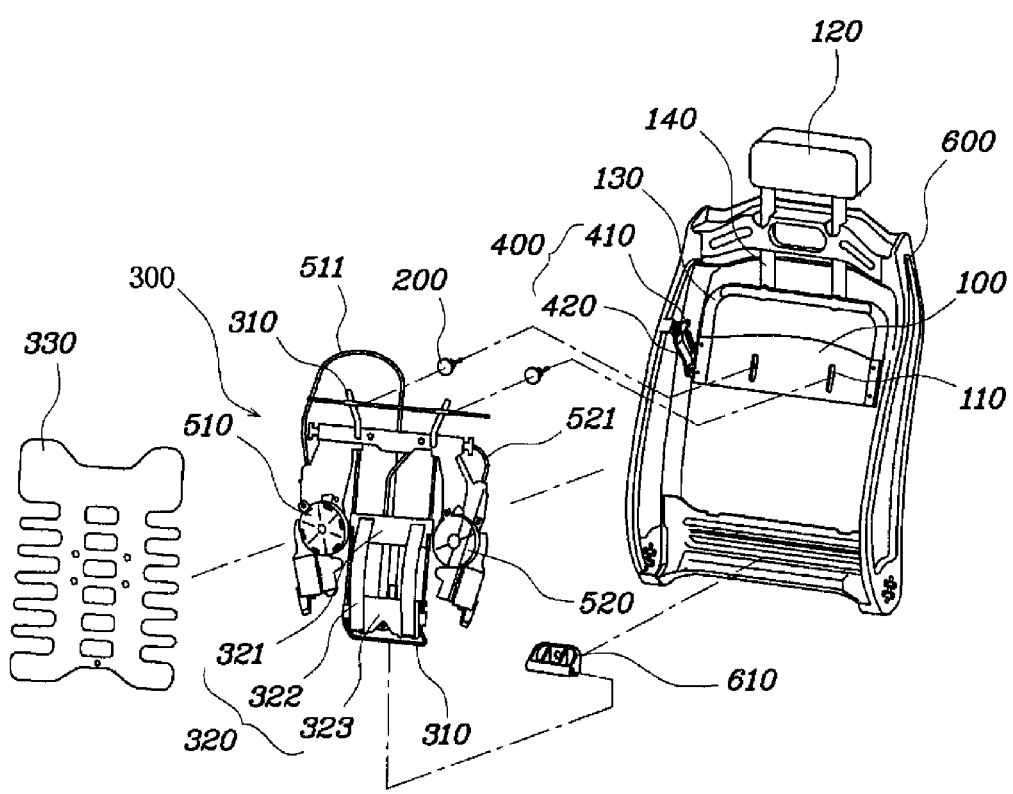
FIG. 1 is an exploded perspective view illustrating an active headrest assembly for a vehicle in accordance with an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in more detail to an exemplary embodiment of the present invention, as illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
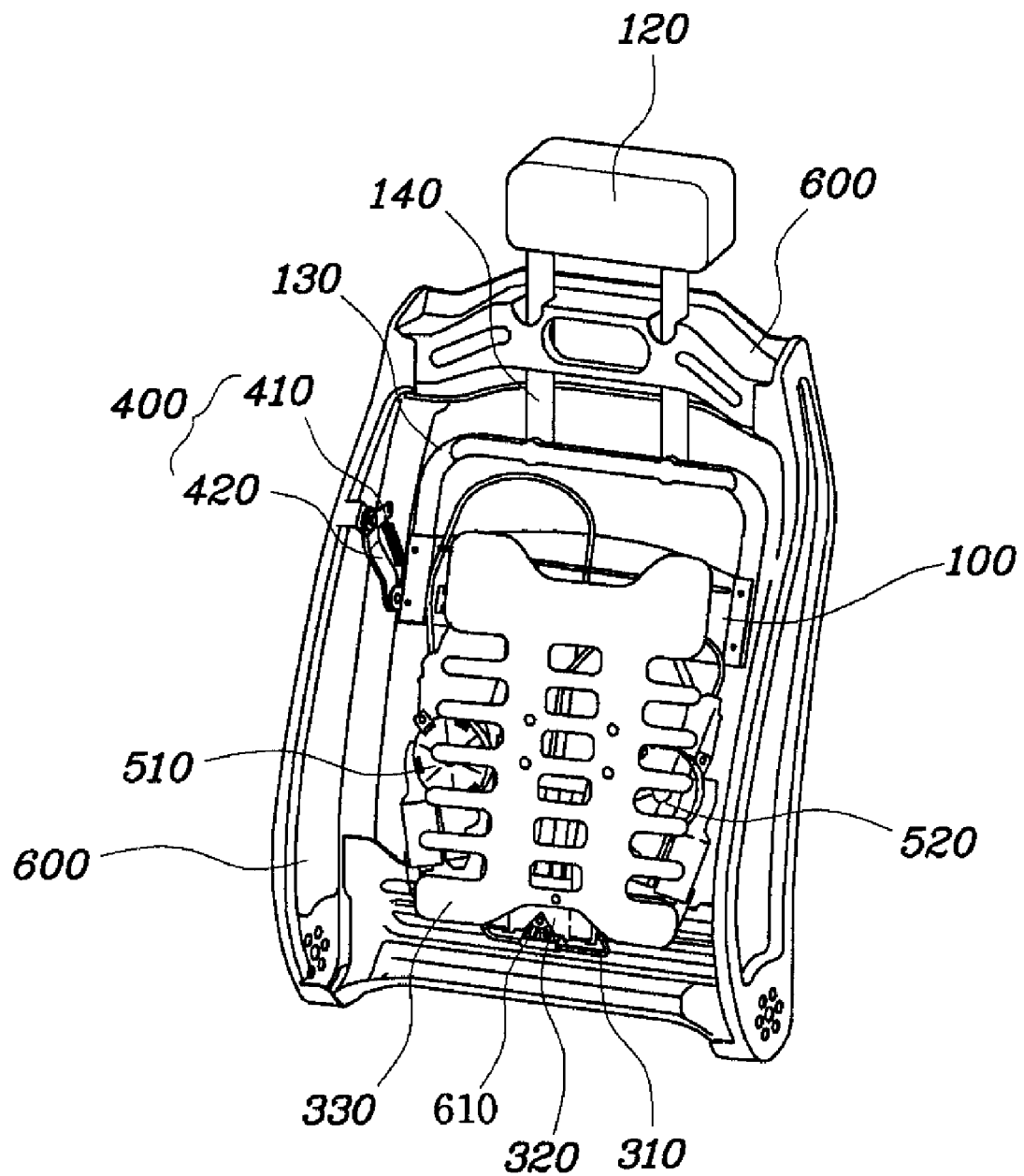
FIG. 2 is an assembled perspective view illustrating an active headrest assembly for a vehicle in accordance with an exemplary embodiment of the present invention.

Referring to FIGS. 1 and 2, an active headrest assembly in accordance with an embodiment of the present invention is mounted to the seat back of a vehicle. The active headrest assembly includes a headrest 120, which is supported by a seat back frame 600, an active plate 100, which is defined with guide slots 110, guide pins 200, which are fitted into the guide slots 110, a lumbar unit 300, which is hingedly connected to the lower end of the seat back frame 600 and is fastened to the guide pins 200, and a returning unit 400, which elastically connects the active plate 100 and the lumbar unit 300 with each other.

The seat back frame 600 may include an upper cross member 620, a lower cross member 630, and side frame members 640 connecting the upper cross member 620 with the lower cross member 630 at both ends thereof so as to form a space therein.

The active plate 100 is rotatably connected to the seat back frame 600 of the seat back through the returning unit 400. Both ends of the active plate 100 are connected to the headrest 120 through pipes including a connection pipe 130 and vertical pipes 140. Thus, when the active plate 100 is pressed by the lumbar unit 300, the active plate 100 is rotated rearward while being elastically supported by the returning unit 400, and the headrest 120 is rotated, that is, it projects forward to thus support an occupant's neck.

The returning unit 400 is composed of a rotation bracket 420, which hingedly connects the end of the active plate 100 and the seat back frame 600 with each other, and a spring 410, which elastically connects the rotation bracket 420 and the active plate 100 with each other. The rotation bracket 420 rotates the active plate 100 rearward to operate the active plate 100, and the spring 410 functions to elastically return the rotated active plate 100 to the original position thereof.

The active plate 100 includes guide slots 110, which extend in a vertical direction. The guide pins 200 are inserted through the guide slots 110 and slide along the guide slots 110.

Figure 3:
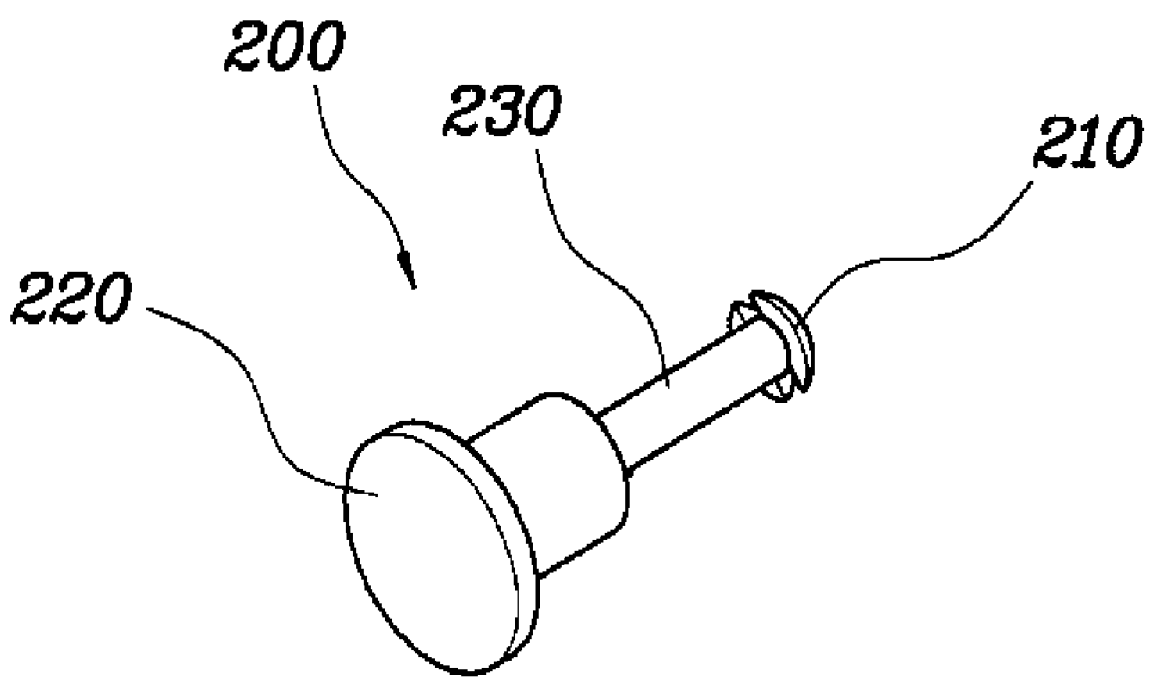
FIG. 3 is a perspective view illustrating a guide pin which is used in an active headrest assembly for a vehicle in accordance with an exemplary embodiment of the present invention.

Referring to FIG. 3, each guide pin 200 has a head portion 220, a conical clip portion 210, which is movably seated against the guide slot 110, and a body portion 230, which connects the head portion 220 and the conical clip portion 210 with each other. The body portion 230 passes through the guide slot 110 to allow the guide pin 200 to slide along the guide slot 110. A support wire 310, which will be described later, is secured to the head portion 220 of each guide pin 200. Therefore, when the support wire 310 is operated, the guide pins 200 can slide along the respective guide slots 110.

Referring again to FIGS. 1 and 2, the lumbar unit 300 including the support wire 310 is structured to cooperate with the active plate 100 by the medium of the support wire 310. The lumbar unit 300 includes the support wire 310, which is arranged in the vertical direction in the seat back frame 600 and has a "U"-shaped configuration, a support plate 320, which is connected to the support wire 310 to slide along the support wire 310 in the vertical direction, and a lumbar plate 330, which is secured to the front surface of the support plate 320.

The upper end of the support wire 310 is secured to the guide pins 200 and slides with respect to the active plate 100. The lower end of the support wire 310 is hingedly connected to the lower end of the seat back frame 600 by the medium of a hinge bracket 610.

If a shock is generated when the vehicle is in a collision, as force is applied to the lumbar unit 300 by the occupant leaning on the seat back, the support wire 310 of the lumbar unit 300 is rotated rearward around the lower end of the seat back frame 600 and pushes the active plate 100 rearward. At this time, the guide pins 200, secured to the support wire 310, slide downward along the guide slots 110 of the active plate 100 and push the active plate 100 rearward.

The support plate 320 is composed of an upper plate 321, a lower plate 323, which is separate from and located below the upper plate 321, and curved plates 322, which connect the upper plate 321 and the lower plate 323 with each other. The curved plates 322 are secured to the rear surface of the lumbar plate 330. When the distance between the upper plate 321 and the lower plate 323 varies, the curved plates 322 can be bent or straightened. By the bending or straightening of the curved plates 322, the lumbar plate 330 can also be bent or straightened.

In order to adjust the distance between the upper plate 321 and the lower plate 323, a first actuator 510 and a second actuator 520 can be connected to the lumbar unit 300. The first actuator 510 is drivably connected to the upper plate 321 and the lower plate 323 through a first wire 511 to raise and lower the support plate 320. The second actuator 520 is connected to the upper plate 321 through a second wire 521 to bend the lumbar plate 330.

The operation of the active headrest assembly for a vehicle according to an exemplary embodiment of the present invention, constructed as mentioned above, will be described below.

Figure 4:
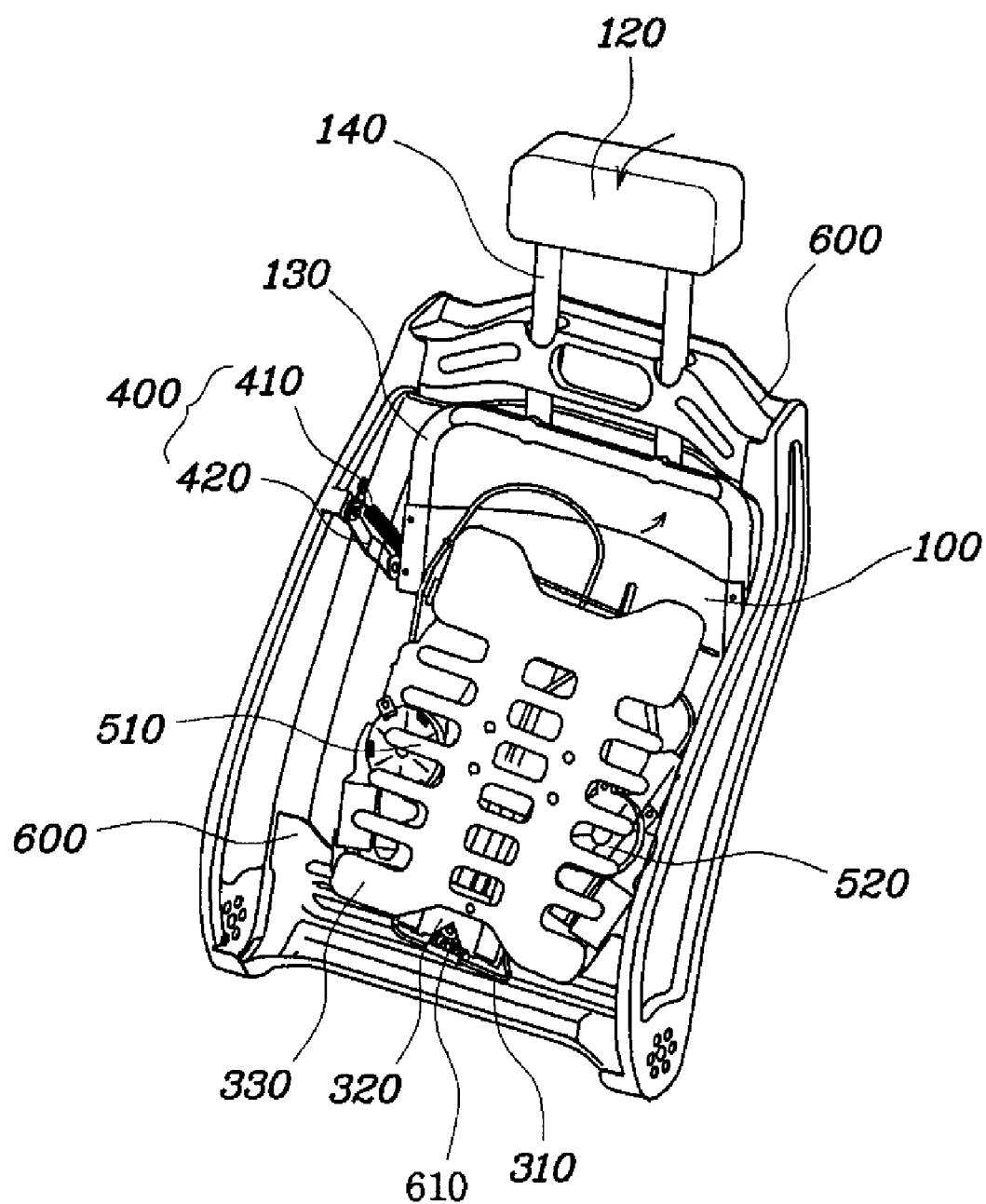
FIG. 4 is a perspective view illustrating the state in which an active headrest assembly for a vehicle in accordance with an exemplary embodiment of the present invention operates.

If a shock is generated when the vehicle is in a collision, as shown in FIG. 4, force is applied to the lumbar unit 300 by the occupant leaning on the seat back. As force is applied to the lumbar unit 300, the support wire 310 of the lumbar unit 300 is rotated rearward around the lower end of the seat back frame 600 and pushes the active plate 100 rearward. The guide pins 200 secured to the support wire 310 then slide downward along the guide slots 110 of the active plate 100 and push the active plate 100 rearward.

When the active plate 100 is pressed by the lumbar unit 300, the active plate 100 is rotated rearward while being elastically supported by the returning unit 400, and the headrest 120 projects forward and supports the occupant's neck.

As is apparent from the above description, the present invention provides advantages in that riding comfort can be improved as an occupant leans with his or her back on a lumbar unit. Since the lumbar unit is rotated around the lower end of a seat back frame and rotates a headrest forward, the extent of injury to an occupant's neck can be decreased when a collision between vehicles occurs.

Further, in the present invention, because an active plate cooperates with the lumbar unit, the operation responsiveness of the headrest can be improved.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An active headrest assembly for a vehicle, comprising:

a headrest supported by a seat back frame including an upper cross member, a lower cross member, and side frame members connecting the upper cross member with the lower cross member at both ends thereof so as to form a space therein;

an active plate secured in the space and connected to the headrest and pivotally coupled to the upper cross member of the seat back frame so as to be moved in response to a predetermined force applied to the active plate and thereby move the headrest pivotally toward an occupant, wherein the active plate includes vertical guide slots defined therein;

guide pins slidably secured to the vertical guide slots of the active plate;

a lumbar unit including a support plate, a lumbar plate to cover the support plate, and a U-shaped support wire disposed below the lumbar plate and configured to slidably support the support plate, wherein distal ends of the U-shaped support wire includes the guide pins, a lower portion of the U-shaped support wire is hingedly connected to the lower cross member of the seat back frame, and the guide pins attached to the U-shaped support wire move the active plate in a rearward direction while the guide pins pulls the active plate in response to the predetermined force; and returning units elastically connecting the side frame members to the active plate and configured to return the active plate by an elastic force of the returning units as the predetermined force applied to the active plate is released;

wherein the guide pin comprises a clip portion having a conical shape and seated against the guide slot, a head portion, to which an end of the support wire is secured, and a body portion connecting the clip portion and the head portion with each other and slides along the guide slot.

2. The active headrest assembly according to claim 1, wherein the support plate comprises an upper plate, a lower plate separate from and located below the upper plate, and curved plates secured to a rear surface of the lumbar plate and connecting the upper plate and the lower plate with each other.

3. The active headrest assembly according to claim 1, wherein the returning unit comprises a rotation bracket hingedly connecting an end of the active plate and the seat back frame with each other, and a spring elastically connecting the rotation bracket and the active plate with each other.

4. The active headrest assembly according to claim 1, wherein the lumbar unit further comprises a first actuator connected to the support plate to raise and lower the support plate, and a second actuator connected to the support plate to bend the lumbar plate.

5. The active headrest assembly according to claim 1, wherein, when an upper end of the lumbar unit is pushed rearward, the support wire presses the active plate, and the headrest projects forward to support an occupant's neck.

* * * * *